United States Patent
Li (10) Patent No.: US 11,102,106 B2
(45) Date of Patent: Aug. 24, 2021

(54) DYNAMIC FLOODING FOR LINK STATE PROTOCOLS

(71) Applicant: Arista Networks, Inc., Santa Clara, CA (US)

(72) Inventor: Anthony Joseph Li, Los Altos, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/945,038

(22) Filed: Apr. 4, 2018

(65) Prior Publication Data

US 2019/0312805 A1 Oct. 10, 2019

(51) Int. Cl.
| | |
|---|---|
| *H04L 12/759* | (2013.01) |
| *H04L 12/721* | (2013.01) |
| *H04L 12/801* | (2013.01) |
| *H04L 12/931* | (2013.01) |
| *H04L 12/733* | (2013.01) |

(Continued)

(52) U.S. Cl.
CPC .......... *H04L 45/028* (2013.01); *H04L 45/123* (2013.01); *H04L 45/32* (2013.01); *H04L 45/00* (2013.01); *H04L 45/02* (2013.01); *H04L 45/12* (2013.01); *H04L 45/122* (2013.01); *H04L 45/126* (2013.01); *H04L 45/48* (2013.01); *H04L 47/10* (2013.01); *H04L 47/12* (2013.01); *H04L 47/125* (2013.01); *H04L 47/17* (2013.01); *H04L 49/201* (2013.01)

(58) Field of Classification Search
CPC ....... H04L 45/028; H04L 45/02; H04L 45/00; H04L 45/48; H04L 45/32; H04L 45/123; H04L 45/12; H04L 45/122; H04L 45/126; H04L 47/10; H04L 47/12; H04L 47/125; H04L 47/17; H04L 49/201
USPC ................................ 370/252, 256, 408, 406
See application file for complete search history.

(56) References Cited

U.S. PATENT DOCUMENTS

| | | | |
|---|---|---|---|
| 7,177,951 | B1 | 2/2007 | Dykeman et al. |
| 7,281,057 | B2 | 10/2007 | Cain |

(Continued)

OTHER PUBLICATIONS

"Information technology—Telecommunications and information exchange between systems—Intermediate System to Intermediate System intra-domain routeing information exchange protocol for use in conjunction with the protocol for providing the connectionless-mode network service (ISO 8473)"; ISO/IEC 10589:2002(E); 2002.

(Continued)

*Primary Examiner* — Jeffrey M Rutkowski
*Assistant Examiner* — Sudesh M Patidar
(74) *Attorney, Agent, or Firm* — Chamberlain, Hrdlicka, White, Williams & Aughtry (57) ABSTRACT

One or more embodiments of the invention may relate to a method, and/or non-transitory computer readable medium including instructions, for distributing link state information. In one or more embodiments of the invention, the method includes building a link state database on a plurality of network devices; electing a leader from among the plurality of network devices; computing, by the leader, a flooding topology; encoding, by the leader, the flooding topology to obtain an encoded flooding topology; distributing, by the leader, the encoded flooding topology to other network devices of the plurality of network devices.

19 Claims, 4 Drawing Sheets

(51) Int. Cl.
    *H04L 12/701*     (2013.01)
    *H04L 12/753*     (2013.01)
    *H04L 12/751*     (2013.01)
    *H04L 12/803*     (2013.01)

(56) References Cited

U.S. PATENT DOCUMENTS

| | | | |
|---|---|---|---|
| 8,214,447 | B2 | 7/2012 | Deslippe et al. |
| 8,995,303 | B1 | 3/2015 | Brar et al. |
| 9,253,663 | B2 | 2/2016 | Raleigh et al. |
| 9,491,089 | B2 | 11/2016 | Bhatt et al. |
| 9,584,363 | B1 | 2/2017 | Olson |
| 9,674,193 | B1 | 6/2017 | Madasamy |
| 9,712,390 | B2 | 7/2017 | Lissack |
| 9,760,598 | B1 | 9/2017 | Holenstein et al. |
| 9,984,140 | B1 | 5/2018 | Sukumaran et al. |
| 10,218,610 | B2 | 2/2019 | Frost et al. |
| 10,469,360 | B1 | 11/2019 | Bhat et al. |
| 10,623,285 | B1 | 4/2020 | Shevade |
| 2003/0115364 | A1* | 6/2003 | Shu ............... H04L 63/0428 709/246 |
| 2004/0143425 | A1* | 7/2004 | Rosenberg ............ G06F 30/18 703/2 |
| 2005/0265260 | A1* | 12/2005 | Zinin ............... H04L 45/02 370/255 |
| 2007/0124375 | A1 | 5/2007 | Vasudevan et al. |
| 2007/0280102 | A1 | 12/2007 | Vasseur et al. |
| 2009/0144443 | A1 | 6/2009 | Vasseur et al. |
| 2009/0245137 | A1 | 10/2009 | Hares et al. |
| 2010/0057563 | A1 | 3/2010 | Rauber et al. |
| 2010/0296414 | A1* | 11/2010 | Vohra ............... H04L 45/00 370/254 |
| 2011/0103228 | A1* | 5/2011 | Sheth ............... H04L 45/66 370/238 |
| 2012/0087304 | A1 | 4/2012 | Porat |
| 2013/0077621 | A1 | 3/2013 | Jacob Da Silva et al. |
| 2013/0145461 | A1 | 6/2013 | Barton et al. |
| 2013/0173876 | A1 | 7/2013 | Namjoshi |
| 2013/0311229 | A1 | 11/2013 | Hadar et al. |
| 2014/0269421 | A1 | 9/2014 | Previdi et al. |
| 2014/0269725 | A1 | 9/2014 | Filsfils et al. |
| 2015/0127789 | A1 | 5/2015 | Lissack |
| 2016/0027292 | A1 | 1/2016 | Kerning |
| 2016/0094398 | A1* | 3/2016 | Choudhury ............ H04L 45/42 370/254 |
| 2016/0134482 | A1 | 5/2016 | Beshai |
| 2016/0164716 | A1 | 6/2016 | Dusi |
| 2016/0248656 | A1 | 8/2016 | Anand et al. |
| 2016/0248658 | A1 | 8/2016 | Patel et al. |
| 2017/0353360 | A1 | 12/2017 | Hayashitani et al. |
| 2018/0041360 | A1 | 2/2018 | Shen et al. |
| 2018/0176082 | A1 | 6/2018 | Katz et al. |
| 2018/0176093 | A1 | 6/2018 | Katz et al. |

OTHER PUBLICATIONS

J. Moy; "OSPF Version 2"; STD 54, RFC 2328; DOI 10.17487/RFC2328, Apr. 1998; https://tools.ietf.org/html/rfc2328.
R. Coltun et al.; "OSPF for IPv6"; RFC 5340; DOI 10.17487/RFC5340, Jul. 2008; https://tools.ietf.org/html/rfc5340.
C. Filsfils et al.; "Segment Routing Architecture, draft-ieff-spring-segment-routing-13" Oct. 2017; https://tools.ietf.org/id/draft-ietf-spring-segment-routing-13.html.
N. Shen et al.; "IS-IS Routing for Spine-Leaf Topology"; Internet Draft, Networking Working Group; Jan. 2, 2018; XP015124979.
T. Li, Arista Networks; "Dynamic Flooding for IS-IS"; Internet Draft, Internet Engineering Task Force; Jan. 7, 2018; XP015125062.
T. Li, Arista Networks; "Dynamic Flooding on Dense Graphs"; Internet Draft, Internet Engineering Task Force; Mar. 26, 2018.

* cited by examiner

DYNAMIC FLOODING FOR LINK STATE PROTOCOLS

BACKGROUND

Networks of interconnected devices (e.g., computer networks) often include any number of network devices. Such network devices may be arranged in a network topology in order to provide connectivity between devices within and outside of the network. Within such network topologies, routing protocols are often implemented that distribute certain information, at least in part, by flooding the information (e.g., in packets) from each network device in the topology to all directly connected network devices. Such flooding may be redundant, and, as such, may lead to reduced or sub-optimal performance of the network topology and/or one or more network devices within the network topology.

SUMMARY

In general, in one aspect, embodiments of the invention relate to a method for distributing link state information. In one or more embodiments of the invention, the method includes building a link state database on a plurality of network devices; electing a leader from among the plurality of network devices; computing, by the leader, a flooding topology; encoding, by the leader, the flooding topology to obtain an encoded flooding topology; distributing, by the leader, the encoded flooding topology to other network devices of the plurality of network devices.

In general, in one aspect, embodiments of the invention relate to a non-transitory computer readable medium including instructions that, when executed by a processor, perform a method of distributing link state information traffic. In one or more embodiments of the invention, the method includes building a link state database on a plurality of network devices; electing a leader from among the plurality of network devices; computing, by the leader, a flooding topology; encoding, by the leader, the flooding topology to obtain an encoded flooding topology; and distributing, by the leader, the encoded flooding topology to other network devices of the plurality of network devices.

DETAILED DESCRIPTION

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to reducing overhead associated with the flooding of link state updates within a network topology in which a link-state routing protocol is implemented. Specifically, in one or more embodiments of the invention, once a link state database has been built on network devices within a network topology, one of the network devices is elected as a leader. In one or more embodiments of the invention, the leader computes a flooding topology, encodes the flooding topology, and distributes the flooding topology to other network devices in the network topology for use when transmitting link state updates. More specifically, the flooding topology computed by the leader may ensure that each network device has at least two paths to each other network device, that no one network device has too many links within the flooding topology (i.e., the degree of each network device is below a degree threshold), and that the diameter of the flooding topology is below a diameter threshold. In one or more embodiments of the invention, such a flooding topology restricts the flooding of link state updates to a subset of all links of the network devices within a network topology, while still distributing the link state updates to all network devices, which may avoid degradation of the performance of one or more of the network devices, and/or of the network as a whole (e.g., due to link state updates being dropped when packet queue sizes are exceeded).

Figure 1:
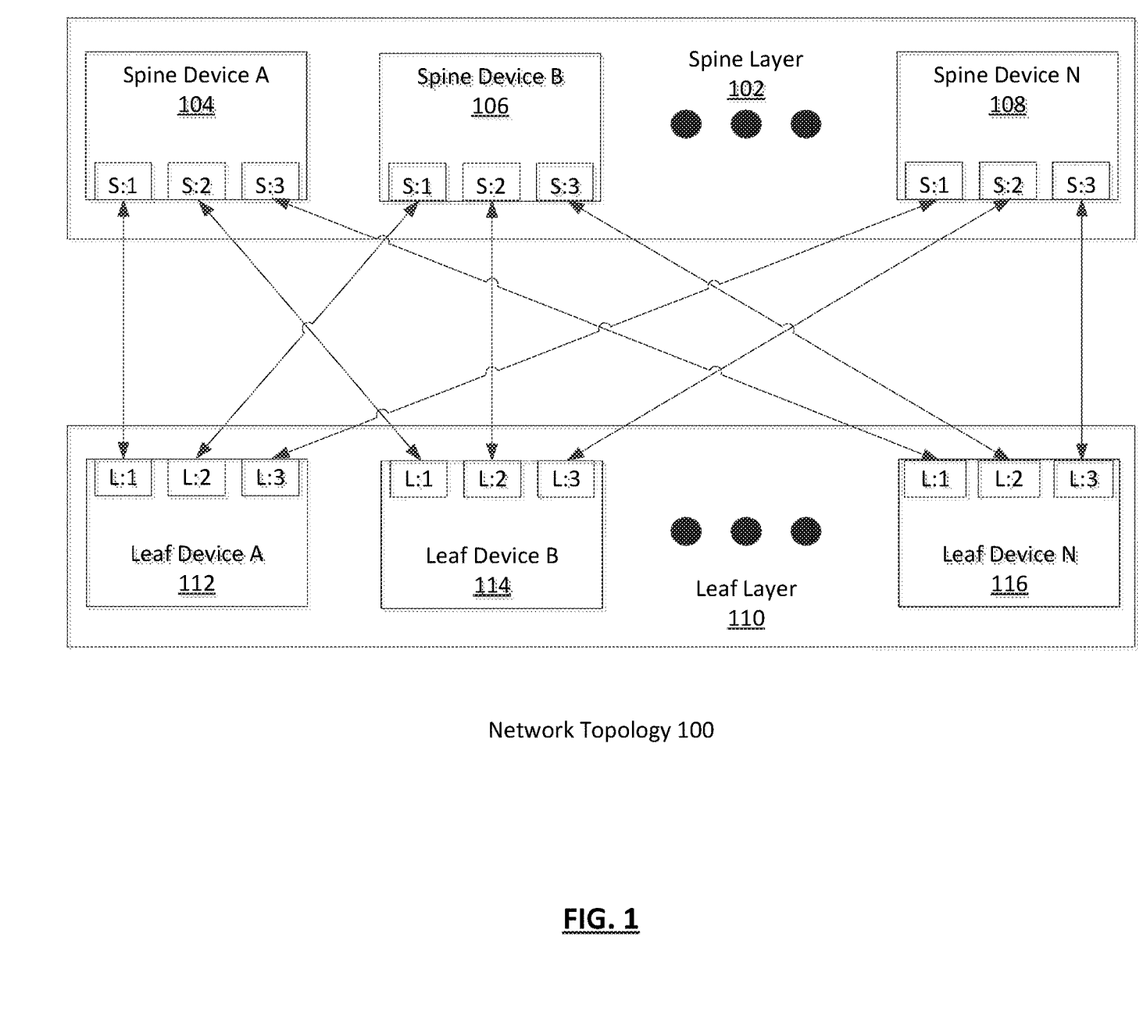
FIG. 1 shows a network topology in accordance with one or more embodiments of the invention.

FIG. 1 shows a network topology in accordance with one or more embodiments of the invention. As shown in FIG. 1, the network topology (100) includes a spine layer (102) and a leaf layer (110). The spine layer (102) may include any number of spine devices, such as spine device A (104), spine device B (106), and spine device N (108). The leaf layer (110) may include any number of leaf devices, such as leaf device A (112), leaf device B (114), and leaf device N (116). Each of these components is described below.

In one or more embodiments of the invention, a network topology (100) is an arrangement of various elements of a network. In one or more embodiments of the invention, a network includes a collection of one or more network devices (e.g., spine devices (104, 106, 108), leaf devices (112, 114, 116)) that facilitate network connectivity for one or more operatively connected devices (e.g., computing devices, data storage devices, etc.). As used herein, the term operatively connected, or operative connection, means that there exists between elements/components a direct or indirect connection that allows the elements to interact with one another in some way. For example, such elements may exchange information, send instructions to perform actions, cause changes in state and/or operating condition, etc. Additionally, as used herein, a network may be an entire network or any portion thereof (e.g., a logical area of network devices within the network topology). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments of the invention, the network topology (100) is a bipartite network topology. In one or more embodiments of the invention, a bipartite network topology is a network topology in which there are at least two sets of network devices, with connections between devices of one set and devices of another set, but no connections between devices within a given set. Examples of such network topologies include, but are not limited to, a folded three-stage Clos network topology, a fat tree topology (i.e., Leiserson topology), and a spine-leaf topology. In one or more embodiments of the invention, such network topologies may be referred to as dense network topologies. In one or more embodiments of the invention, a dense network topology is a network topology in which the network devices are highly interconnected, with, as an example, each device in a first set of network devices being connected to each device in a second set of network devices within the network topology. In the exemplary embodiment shown in FIG. 1, the network topology (100) is a spine-leaf topology. Although, FIG. 1 shows an example of a spine-leaf topology, in one or more embodiments of the invention, the network topology is not limited to being a spine-leaf topology (or the particular example shown), or any other example of a dense network topology set forth herein.

In one or more embodiments of the invention, when a network topology (100) is arranged as a spine-leaf topology, the network topology (100) includes a leaf layer (110) and a spine layer (102).

In one or more embodiments of the invention, a leaf layer (110) is a set of any number of network devices (e.g., leaf devices (112, 114, 116)) that provide network connectivity to any number of attached devices, such as computing devices (not shown). In one or more embodiments of the invention, a computing device is any device or any set of devices capable of electronically processing instructions and that includes, at least, one or more processors, memory, input and output device(s), and network connectivity via a leaf layer (110). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer, and/or any other mobile computing device), and/or any other type of computing device with the aforementioned requirements. Other examples of devices for which a leaf layer (110) may provide network connectivity include, but are not limited to, data storage devices (not shown), other network devices (e.g., wireless routers) (not shown), media devices (e.g., televisions) (not shown), etc.

In one or more embodiments of the invention, a spine layer (102) is a set of any number of network devices (e.g., spine devices (104, 106, 108)) that provide network connectivity between network devices of a leaf layer (110), and may also be operatively connected to other network devices, such as edge routers (not shown), gateway routers (not shown), network controllers (not shown), etc. In one or more embodiments of the invention, each leaf device (112, 114, 116) within a leaf layer (102) is operatively connected to each spine device (104, 106, 108) within a spine layer (102), and each spine device (104, 106, 108) within a spine layer is operatively connected to each leaf device (112, 114, 116) within a leaf layer (102). Such connections may be referred to as creating a dense mesh (e.g., a full mesh) between the leaf layer (110) and the spine layer (102), thereby creating a dense network topology (100).

In one or more embodiments of the invention, each leaf device (112, 114, 116) and each spine device (104, 106, 108) is a network device. In one or more embodiments of the invention, a network device may be a physical device that includes and/or may operatively connected to persistent storage (not shown), memory (e.g., random access memory (RAM)) (not shown), one or more processor(s) (e.g., integrated circuits) (not shown), and two or more physical network interfaces (which may also be referred to as ports). As shown in FIG. 1, examples of such interfaces include ports S:1, S:2, and S:3 on each spine device (104, 106, 108) and ports L:1, L:2, and L:3 on each leaf device (112, 114, 116). Although not shown in FIG. 1, leaf devices (112, 114, 116) and/or spine devices (104, 106, 108) may have any number of additional ports. In one or more embodiments of the invention, the one or more processors of a network device (e.g., a central processing unit) are separate components from a network chip, one or more of which may also be components of a network device.

In one or more embodiments of the invention, the network device also includes any number of network chips. In one or more embodiments of the invention, a network chip is any hardware (e.g., circuitry), software, firmware, and/or combination thereof that includes functionality to receive, process, and/or transmit network traffic data units in accordance with one or more embodiments of the invention. In order to perform such functionality, a network chip may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip may also include and/or be operatively connected to any number of physical network interfaces (e.g., L:1, L:2, L:3, S:1, S:2, or S:3 as shown in FIG. 1) of a network device. Such interfaces may provide a path external to the network device (e.g., to other devices), and/or may be operatively connected to other components internal to the network device (100), and each such interface may be an ingress and/or egress interface.

In one or more embodiments of the invention, a network device includes functionality to receive network traffic data units (e.g., frames, packets, etc.) at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical network interface or port on the network device in accordance with one or more embodiments of the invention.

As a non-limiting example, a network chip may be hardware that receives network traffic data units at an ingress port, and determines out of which egress port on the network device (100) to forward the network traffic data units such as, for example, media access control (MAC) frames that may include Internet Protocol (IP) packets.

In one or more embodiments of the invention, a network device (e.g., leaf devices (112, 114, 116), spine devices (104, 106, 108)) may include functionality to store (e.g., in persistent storage, in memory, etc.), any number of data structures for facilitating operation of at least some aspects of the network device. An example of such a data structure is a link state database (not shown).

In one or more embodiments of the invention, a link state database is a data structure for storing link state information received from neighboring network devices via the ports of a network device. In one or more embodiments of the invention, network devices within a network topology (100) (or a portion thereof (e.g., a logical area within the topology)) share link state information using any of a variety of types data units (e.g., packets, frames, messages, advertisements, etc.). Such data units may be sent from one network device to directly connected adjacent network devices, and may include information related to the state of links between the sending network device and other devices to which the sending network device is operatively connected.

When a data unit that includes link state information is received at a network device from an adjacent network device, the receiving network device may, in turn, propagate the data unit to its own adjacent network devices. Such sharing of link state information between network devices may occur within a network topology implementing an interior gateway protocol (IGP). Examples of an IGP include, but are not limited to, intermediate system to intermediate system (IS-IS) and open shortest path first (OSPF), each of which may be referred to as a type of IGP known as a link-state routing protocol.

In one or more embodiments of the invention, when a link-state routing protocol is implemented within a given network topology (or a portion therein), each device participating in the link-state routing topology receives, directly or indirectly, link state information from other devices in the network topology, or logical area within the network topology. In one or more embodiments of the invention, each network device uses the received information to build a mapping of the connectivity of network devices within the topology or logical area. Information relating to the mapping may be stored in the link state database.

A network device with a complete mapping of the connectivity of network devices within a topology or logical area may then use any scheme (e.g., the Dijkstra algorithm) to determine a best path (e.g., shortest path, path with the least cost, etc.) from itself to other network devices in the network topology or logical area, and such information may be stored in the link state database and/or used to program other portions of the network device (e.g., a routing information base) with information to be used, for example, when processing a received network traffic data unit. The map of connectivity should be the same on each network device in a topology or logical area, unless one or more network devices have a change in information related to the state of one or more links. Accordingly, once a mapping has been determined, link state information may be sent from a given network device only when a change to link state information of any link of a network device occurs.

Link-state routing protocols often implement the sending of link state information to adjacent devices in a process often referred to as flooding, which is when the information is sent to each adjacent connected network device, all of which then send to each of their adjacent network devices, and so on, until all network devices have received the link state information. However, in a dense network topology (100), such flooding may lead to a large quantity of redundant data units being transmitted to network devices.

For example, in the spine-leaf network topology (100) shown in FIG. 1, if a link state change is detected on leaf device A (112), information related to the change may be flooded to each of the three spine devices (104, 106, 108). Each of the spine devices may then send the change to leaf device B (114) and leaf device N (116), each of which may send the change back to spine devices, etc. Such redundancy of receipt of link state information when changes occur within a dense network topology may lead to reduced performance of any given network device and/or the network topology as a whole, because each redundant data item must be processed in order to determine that it may ultimately be discarded. As an example, the packet queues (not shown) of a network device leading to a control plane (not shown) of the network device are necessarily of finite size. Therefore, if the flooding rate exceeds the update processing rate for enough time, the control plan may be obligated to drop incoming updates. If such lost updates are of significance, stabilization of the link state database and the convergence of the network may be delayed.

One or more embodiments of the invention may lessen the possibility of reduced performance by only flooding link state change information within a computed flooding topology, which uses only a subset of the links connecting network devices within a network topology (100). Flooding topologies are discussed further in the description of FIG. 2, below.

In one or more embodiments of the invention, the network device also includes software and/or firmware stored in any network device storage (not shown) and/or network device memory (not shown) (i.e., non-transitory computer readable mediums). Such software may include instructions which, when executed by the one or more processors (not shown) of the network device, cause the one or more processors to perform operations in accordance with one or more embodiments of the invention. The software instructions may be in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention. The functionality of a network device is not limited to the aforementioned examples.

Examples of a network device include, but are not limited to, a network switch, a router, a multilayer switch, a fibre channel device, an InfiniBand® device, etc. A network device is not limited to the aforementioned specific examples.

While FIG. 1 shows a configuration of components, other configurations may be used without departing from the scope of the invention. For example, the network topology may be any dense network topology other than the spine-leaf topology shown in FIG. 1. As another example, the quantity of network devices in the spine layer may be less (or more)

than the quantity of network devices in the leaf layer. As another example, each leaf device and each spine device may have any number of additional ports for connecting to any number of other devices, or that may not be connected to any other device at a given time. Accordingly, embodiments disclosed herein should not be limited to the configuration of components shown in FIG. 1.

Figure 2:
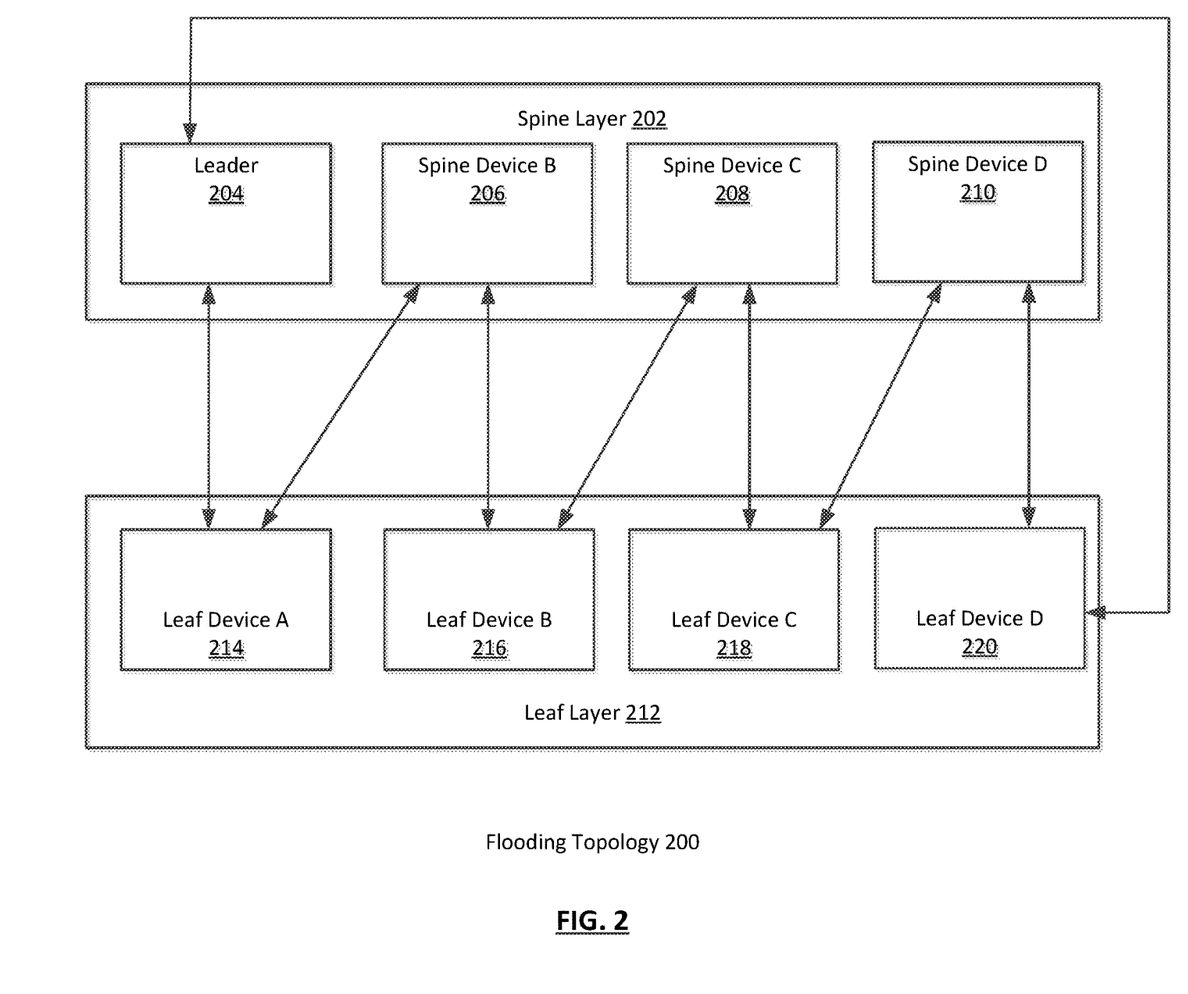
FIG. 2 shows a flooding topology in accordance with one or more embodiments of the invention.

FIG. 2 shows a flooding topology in accordance with one or more embodiments of the invention. As shown in FIG. 2, the flooding topology (200) includes a leaf layer (212) and a spine layer (202). The spine layer (202) may include a leader (204), spine device B (206), spine device C (208), and spine device D (210). The leaf layer may include leaf device A (214), leaf device B (216), leaf device C (218), and leaf device D (220). Each of these components is described below.

In one or more embodiments of the invention, the leaf layer (212) is substantially similar to the leaf layer (110) shown in FIG. 1 and discussed above. Additionally, in one or more embodiments of the invention, the spine layer (202) is substantially similar to the spine layer (102) shown in FIG. 1 and discussed above.

In one or more embodiments of the invention, each of the leaf devices (214, 216, 218, 220) and each of the spine devices (204, 206, 208, 210) are network devices and, as such, are substantially similar, respectively, to the leaf devices (112, 114, 116) and the spine devices (104, 106, 108) shown in FIG. 1 and discussed above. However, for the sake of clarity, all of the connections between each leaf device (214, 216, 218, 220) and each spine device (204, 206, 208, 210) are not shown in FIG. 2. Instead, only a subset of the connections is shown. The subset may be referred to as a flooding topology (200).

In one or more embodiments of the invention, a flooding topology (200) is a subset of links within a dense network topology that includes enough links such that there is at least one path between each network device in the topology to each other network device in the topology. In one or more embodiments of the invention, link state updates are only flooded on links included in the flooding topology (200), rather than to all links connected to adjacent network devices, which may reduce the redundancy of flooding within a network topology implementing a link-state routing protocol. In one or more embodiments of the invention, a flooding topology (200) may include more than one path between each device and every other device. For example, as shown in FIG. 2, there are two paths between each network device and every other network device, which may be referred to as a bi-connected flooding topology.

However, while the simple bi-connected cycle shown in FIG. 2 may be adequate as a flooding topology (200) for correctness and resiliency, such a flooding topology may not be optimal for convergence of link state databases on each of the network devices within the topology, because the diameter (i.e., the longest path between any two network devices in a topology) of the flooding topology may be half the number of network devices in the topology, which may cause an undesired delay in link state update propagation. Therefore, in one or more embodiments of the invention, the actual flooding topology may have a bound on the diameter, which may be referred to as a diameter threshold.

Additionally, although FIG. 2 shows a flooding topology (200) where each network device has two links used as part of the flooding topology, as more redundant paths between nodes are added to a flooding topology (200), and when attempting to keep the diameter of the flooding topology below a diameter threshold, specific network devices may end up with more links as part of the flooding topology than other devices. Having a high number of links as part of the flooding topology may cause reduced performance for the network devices with a high number of links. Accordingly, when computing a flooding topology, in one or more embodiments of the invention, the number of links within the flooding topology (i.e., the degree) of any given network device may be bounded, which may be referred to as a degree threshold.

In one or more embodiments of the invention, at least one network device in the flooding topology is elected as a leader (204). In one or more embodiments of the invention, a leader (204) is a network device elected using any scheme for electing a leader within a network topology of logical area of a network topology. In one or more embodiments of the invention, the leader includes functionality to compute a flooding topology, encode the computed flooding topology, and distribute the encoded flooding topology within a network topology or logical area therein. Election of the leader (204), as well as computation, encoding, and distribution of flooding topology (200), are discussed further in the description of FIG. 3, below.

While FIG. 2 shows a configuration of components, other configurations may be used without departing from the scope of the invention. For example, as discussed above, there may be more links in the subset of links that are the flooding topology, leading to more paths between network devices (i.e., greater path redundancy). As another example, the leader may be any device in the topology, rather than a spine device as shown in FIG. 2. As another example, there may be differing numbers of devices in the spine layer and the leaf layer. As another example, there may be differing numbers of links on the various network devices that are part of the flooding topology. Accordingly, embodiments disclosed herein should not be limited to the configuration of components shown in FIG. 2.

Figure 3:
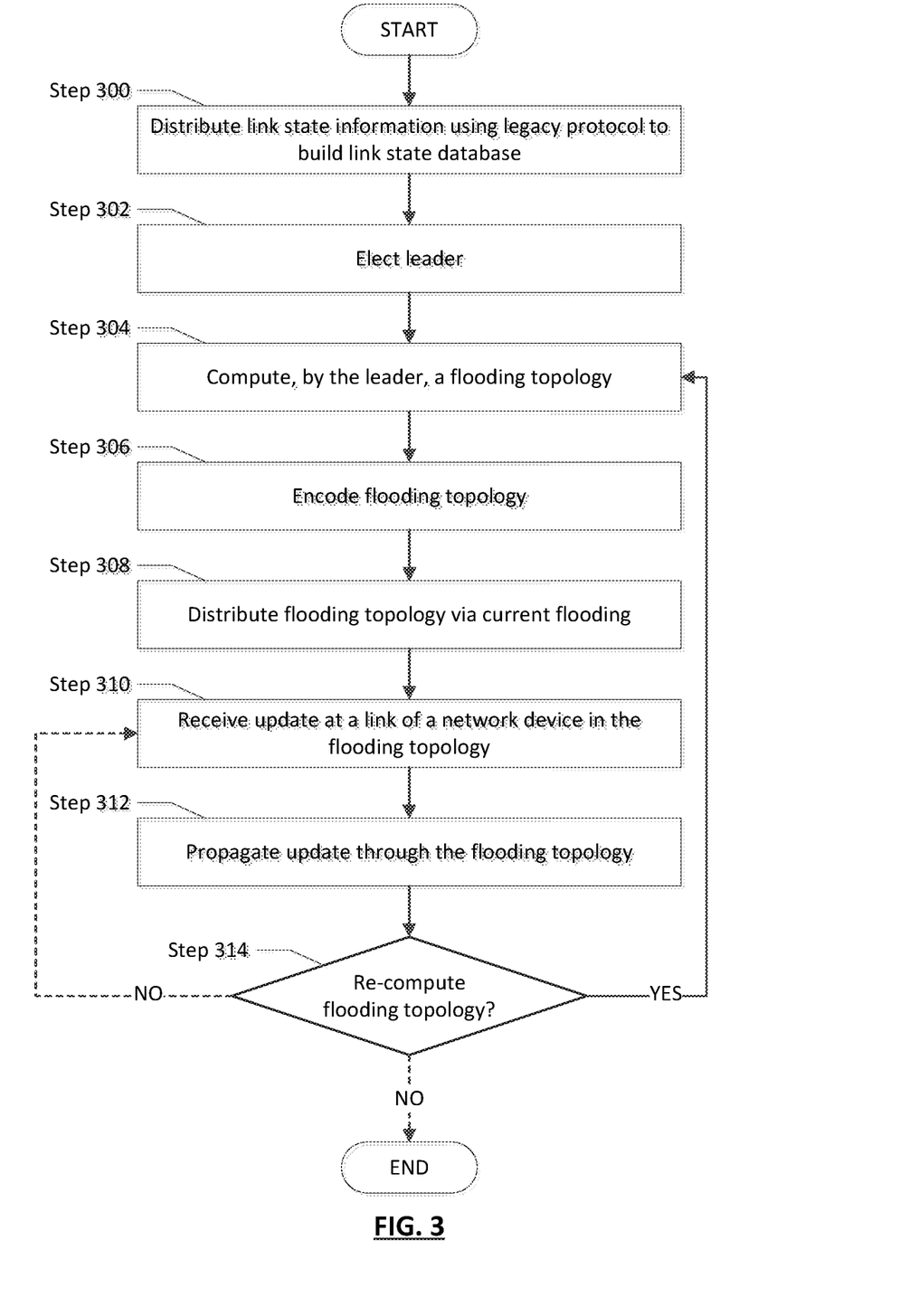
FIG. 3 shows a flowchart in accordance with one or more embodiments of the invention.

FIG. 3 shows a flowchart describing a method for distributing link state updates using a flooding topology in accordance with one or more embodiments of the invention.

In Step 300, link state information is distributed by each network device in order to build a matching link state database on each network device within the network topology or logical area of a network topology. In one or more embodiments of the invention, the initial link state database is built on each network device using any link-state routing protocol scheme. For example, both OSPF and IS-IS protocols cause the network devices flood link state information from each network device to each adjacent network device. In one or more embodiments of the invention, the link state database includes information related to a mapping of the connections between all network devices within the network topology or logical area of the network topology.

In Step 302, once the link state database, including connectivity information, has been built on each network device (i.e., an initial convergence has occurred), a leader is elected from among the network devices. In one or more embodiments of the invention, the leader election may occur using any scheme for electing a single network device from among the network devices in a network topology or logical area of a network topology. Such schemes may include any manner of indicating a leader priority, which may be any identifier capable of indicating a relative priority level from among a group of network devices related to which device should be a leader network device. As an example, each network device may advertise a leader priority, and the network device with the numerically highest leader priority may be elected as the leader. In one or more embodiments of the invention, if more than one network device advertises the same highest leader priority, an election between such devices may be made using any other identifying information of the network devices. For example, from among the network devices advertising the same highest leader priority, the elected leader may be the network device with the numerically highest system identifier, internet protocol address, router identifier, etc.

In Step 304, the leader computes the flooding topology. In one or more embodiments of the invention, computing the flooding topology includes computing a set of links from among all the links of the network devices such that each network device has at least two paths to each other network device. Any higher (or lower) number of paths between any two network devices may be used without departing from the scope of the invention. The determination of the number of paths between network devices, and therefore the level of redundancy of paths, may include a determination of a desired amount of path redundancy versus an acceptable level of redundant distribution of link state updates. Additionally, in one or more embodiments of the invention, computing the flooding topology includes ensuring that the diameter of the flooding topology does not exceed a diameter threshold. Furthermore, in one or more embodiments of the invention, computing the flooding topology includes ensuring that any given network device within the flooding topology does not exceed a degree threshold.

As an example, a computed flooding topology may be referred to as a minimal flooding topology. In one or more embodiments of the invention, a minimal flooding topology is a flooding topology in which the topology is at least bi-connected and each node has at least degree two, which may guarantee that the flooding topology has no single points of failure. In a spine-leaf topology, a minimal flooding topology may cause every leaf device in the flooding topology to have a degree of two. As there are usually more leaf devices than spine devices in a spine-leaf topology, the degree of the spine devices will be higher than that of the leaf devices. In one or more embodiments of the invention, the higher load on the spine devices may be mitigated, at least in part, via an even distribution of the load among the individual spine devices. Accordingly, a minimal flooding topology may scale well with a diameter that is kept below a diameter threshold. For example, for n spine devices and m leaf devices, if $m>=n((n/2)-1)$, then the flooding topology may have a diameter of four.

As another example, a computed flooding topology may be referred to as a Xia topology. In one or more embodiments of the invention, a Xia topology is a flooding topology in which all spine devices are bi-connected through leaf devices with degree two, but the remaining leaf devices all have degree one and are evenly distributed across the spine devices. In one or more embodiments of the invention, a Xia topology represents a compromise that trades off increased risk and decreased performance (relative to a minimal flooding topology) for lower flooding amplification. In one or more embodiments of the invention, a Xia topology may have a larger diameter. For example, for n spine devices, the diameter may be n+2. As discussed above, in a Xia topology, some leaf devices may be singly connected, which may represent a risk in that, during some failures, convergence may be delayed. However, there may be alternate behaviors that can be employed mitigate such risk. For example, if a leaf device sees that its single link on the flooding topology has failed, the leaf device may compensate by performing a link state database synchronization check with a different spine device (i.e., a spine device outside the known flooding topology). Similarly, if a leaf device determines that its connected spine device within the flooding topology has failed, it may compensate by performing a database synchronization check with a different spine device. In both of the aforementioned cases, the synchronization check may ameliorate any delays in link state propagation due to the fragmentation of the flooding topology.

In Step 306, the flooding topology is encoded. In one or more embodiments of the invention, the flooding topology is encoded in any manner of encoding (i.e., representation of data) that is able to represent the connections between the links of the network devices that are included in the flooding topology. For example, if the flooding topology was a simple, bi-connected cycle such as that shown in FIG. 2, the flooding topology may be encoded as a list of nodes and links in the flooding topology, and/or as a set of paths. As another example, the flooding topology may be encoded using an adjacency matrix. In one or more embodiments of the invention, an adjacency matrix is a matrix in which rows represent one set of devices in a bipartite network and the columns represent a second set of devices in the bipartite network, with connections between devices that are included in the flooding topology being represented at the appropriate intersection with a 1, and other intersections that are not within the flooding topology being represented as a 0.

In Step 308, the flooding topology is distributed to all network devices in the network topology or logical area of the network topology using a current flooding topology. In one or more embodiments of the invention, the distribution of the flooding topology is performed using standard flooding (e.g., flooding as used in IS-IS or OSPF) so that all network devices receive the flooding topology. For example, the initial distribution of the flooding topology after the flooding topology is computed by the leader may be performed using a standard flooding topology. In one or more embodiments of the invention, after the initial distribution of the flooding topology, subsequent distributions (e.g., after re-computation of the flooding topology) may be made using the most current flooding topology prior to the re-computation, or the newly re-computed flooding topology. In one or more embodiments of the invention, each network device that receives the flooding topology stores the received flooding topology as a part of its link state database. In one or more embodiments of the invention, any change in link state information detected by any given network device is then transmitted from the network device to adjacent network devices according to the flooding topology, and each adjacent network device that receives such an update also transmits the update via the flooding topology.

In Step 310, a link state update is received by a network device that is a part of the flooding topology. In one or more embodiments of the invention, the link state update is received from either another network device on a link that is included in the flooding topology, or on a link that is outside the flooding topology (e.g., from a network device that is not (yet) part of the flooding topology).

In Step 312, the received link state update is propagated to adjacent network devices according to the flooding topology. For example, if the flooding topology dictates that the network device that received the update in Step 310 should transmit the update to two other network devices, then the link state update is transmitted to only those two devices rather than being flooded to all adjacent network devices. In one or more embodiments of the invention, each of the adjacent devices also transmits the received update according to the flooding topology. In one or more embodiments of the invention, the process continues to transmit the link state update according to the flooding topology until all network devices of the flooding topology, including the leader, have received the link state update.

In Step 314, a determination is made, by the leader, whether the flooding topology should be re-computed. In one or more embodiments of the invention, if the leader determines that the link state update was initially sent from a network device that is already within the flooding topology, and the update does not include a change that requires re-computation of the flooding topology, then the flooding topology is not re-computed, and the process may optionally end. Additionally or alternatively, as shown in FIG. 3, the process may optionally return to Step 310 to await any additional updates that may be received.

In one or more embodiments of the invention, when the leader determines that the link state update that was received in Step 310 includes contents that indicate that updated flooding topology is required, then the process returns to Step 304, and the flooding topology is re-computed, re-encoded, and re-distributed.

For example, a link status update may indicate that a flooding topology is no longer bi-connected, which causes the leader to re-compute the flooding topology to satisfy the condition that the flooding topology be at least bi-connected. Other causes of flooding topology re-computation found in link state updates, such as information related to degree threshold, diameter threshold, that all network devices (e.g., nodes) of the network topology are no longer covered, etc., may be used, alone or in combination, without departing from the scope of the invention.

In one or more embodiments of the invention, if the update causing re-computation of the flooding topology was received from a network device already included in the flooding topology, then the re-computed flooding topology may be sent using the current flooding topology prior to the re-computation or the new flooding topology. In one or more embodiments of the invention, if the update causing the leader to re-compute a flooding topology was received from a new network device not previously included in the flooding topology, then the new network device from which the link state update was initially received in Step 310 is included in the updated flooding topology, and the updated flooding topology is distributed throughout the network (e.g., including to the new network device).

Figure 4:
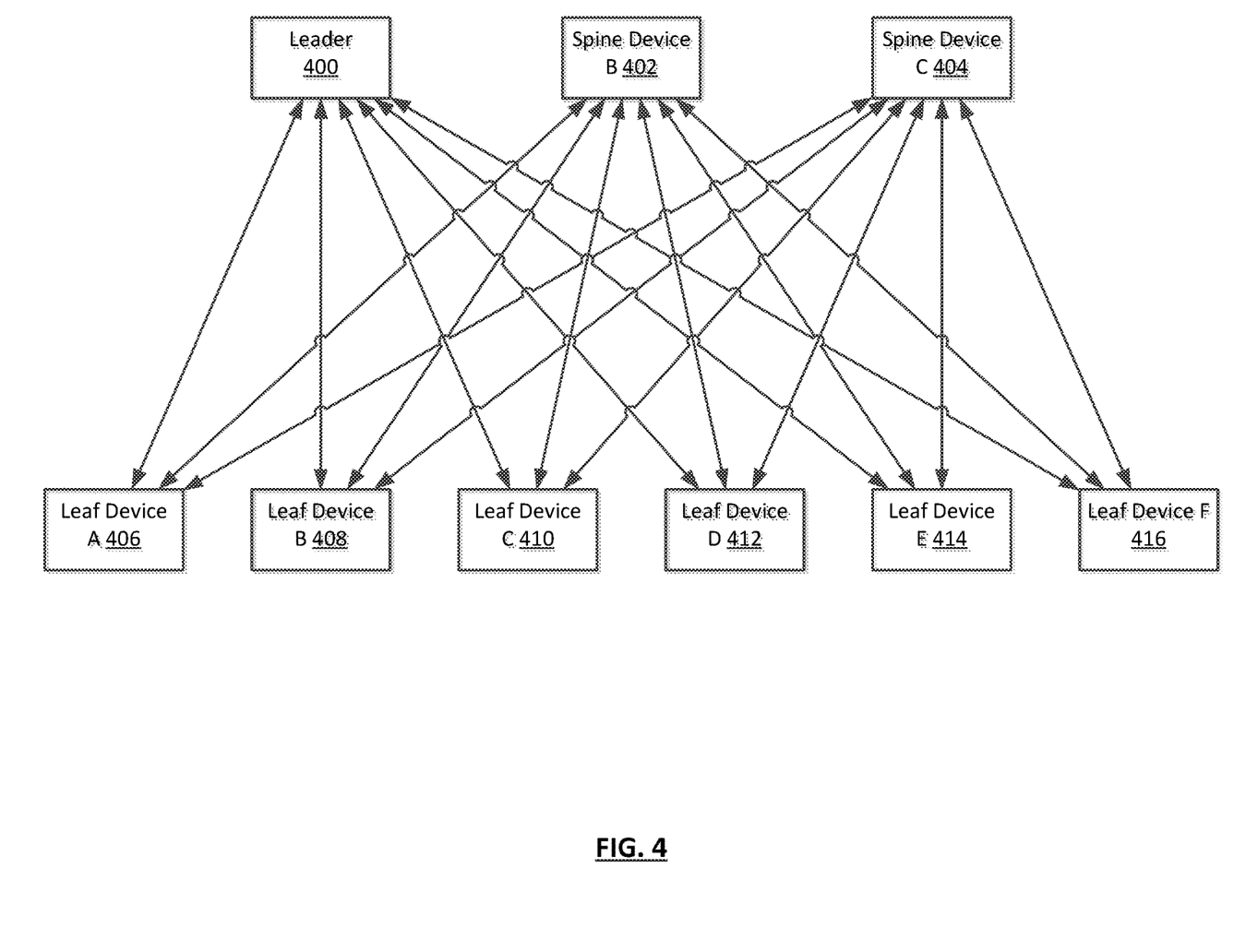
FIG. 4 an example in accordance with one or more embodiments of the invention.

As an example of determining whether to re-compute a flooding topology, if a link is added to the topology, the protocol being used will form a normal adjacency on the link and update the appropriate link state advertisements for the routers on either end of the link. These link state updates may then be flooded on the flooding topology. The leader, upon receiving the updates, may choose to retain the existing flooding topology or may choose to modify the flooding topology. If it elects to change the flooding topology, it will update the flooding topology in the link state database and flood it using the new flooding topology FIG. 4 shows an example in accordance with one or more embodiments of the invention. The following example is for explanatory purposes only and not intended to limit the scope of the invention.

Referring to FIG. 4, consider a scenario in which a spine-leaf topology includes three spine devices (400, 402, 404) and six leaf devices (406, 408, 410, 412, 414, 416). In such a scenario, in order to converge on a common link state database (not shown), each of the spine and leaf network devices floods link state information to all connected adjacent network devices. As such, each of leaf device A (406), leaf device B (408), leaf device C (410), leaf device D (412), leaf device E (414), and leaf device F (416) floods link state information to each of leader (400), spine device B (402), and spine device C (404). Also, each of leader (400), spine device B (402), and spine device C (404) floods link state information to each of leaf device A (406), leaf device B (408), leaf device C (410), leaf device D (412), leaf device E (414), and leaf device F (416). Once all network devices shown in FIG. 4 receive link state information from all other devices, each network device then builds a link state database that includes connectivity information showing a mapping of the entire topology.

Next, a leader (400) is elected. In one or more embodiments of the invention, leader (400) advertises a leader priority of 9, spine device B (402) advertises a leader priority of 8, spine device C (404) advertises a leader priority of 7, leaf device A (406) advertises a leader priority of 6, leaf device B (408) advertises a leader priority of 5, leaf device C (410) advertises a leader priority of 4, leaf device D (412) advertises a leader priority of 3, leaf device E (414) advertises a leader priority of 2, and leaf device E (416) advertises a leader priority of 1. Because leader (400) advertised the numerically highest leader priority, leader (400) is elected as the leader.

Next, the leader (400) computes a minimal flooding topology. As such, each leaf device (406, 408, 410, 412, 414, 416) has a degree two, meaning that two of the links of each leaf device are included in the flooding topology. Each spine device, including the leader, has a degree higher than two. However, as part of the computation, the leader (400) ensures that the load is distributed evenly among the spine devices (400, 402, 404). Additionally, as a parameter of the flooding topology computation, the diameter of the flooding topology is to be kept less than six (i.e., the diameter threshold). In one or more embodiments of the invention, the use of a minimal flooding topology ensures that the diameter is kept below the diameter threshold.

Next, the leader (400) encodes the computed flooding topology as an adjacency matrix, and the encoded flooding topology is flooded to all leaf devices (406, 408, 410, 412, 414, 416), each of which flood the flooding topology to each of the remaining spine devices (402, 404).

Because each of the network devices shown in FIG. 4 now has the encoded flooding topology as part of the link state database, all future link state updates received by any of the network devices is flooding according to the flooding topology rather than to all adjacent connected network devices. The reduction of links on which link state updates are flooded thus reduces the redundancy of link state updates received by any of the network devices, which may help avoid performance reduction of any given network device or the network as a whole resulting from standard flooding of link state updates as seen in existing link-state routing protocols, such as IS-IS or OSPF.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for distributing link state information, the method comprising:
building a link state database on a plurality of network devices in a spine/leaf network topology, wherein the spine/leaf network topology comprises links intercon- necting the plurality of network devices that includes a plurality of spine network devices and a plurality of leaf network devices;

electing a leader from among the plurality of spine network devices;

computing, by the leader, a flooding topology, wherein:

the flooding topology specifies:

the plurality of network devices, a first subset of links between a plurality of non-leader network devices of the plurality of network devices, wherein each of the plurality of non-leader network devices shares link state updates using the first subset of links, a second subset of links of the leader from which the leader will share link state updates, at least one of a first link of each of the plurality of non-leader network devices is not included in the first subset, and at least one of a second link of the leader is not included in the second subset;

the flooding topology comprises a diameter that is below a diameter threshold;

a number of flooding links of any one spine network device of the plurality of spine network devices in the flooding topology does not exceed a spine degree threshold;

a number of flooding links of any one leaf network device of the plurality of leaf network devices in the flooding topology does not exceed a leaf degree threshold; and encoding, by the leader, the flooding topology to obtain an encoded flooding topology;

distributing, by the leader, the encoded flooding topology to the plurality of non-leader network devices;

after the distributing:

receiving a link state update at a non-leader network device of the plurality of non- leader network devices; and transmitting, by the non-leader network device, the link state update to only a subset of adjacent network devices, wherein the subset of adjacent network devices is determined using the encoded flooding topology and the first subset of links of the non-leader network device specified in the encoded flooding topology.

2. The method of claim 1, further comprising:

computing, by the leader, after receiving the link state update, a new flooding topology;

encoding, by the leader, the new flooding topology to obtain a new encoded flooding topology; and distributing, by the leader, the new encoded flooding topology to the plurality of network devices.

3. The method of claim 1, wherein the flooding topology is at least a bi-connected topology.

4. The method of claim 1, wherein encoding the flooding topology is performed using an adjacency matrix.

5. The method of claim 1, wherein encoding the flooding topology is performed using a set of paths.

6. The method of claim 1, wherein electing the leader comprises:

sending, from each of the plurality of network devices, a message comprising a leader priority, wherein the leader is elected based on having a highest leader priority.

7. The method of claim 6, wherein, when two network devices of the plurality of network devices have a same leader priority, the leader is elected based from among the two network devices by having a numerically higher identifier.

8. The method of claim 1, wherein building the link state database on the plurality of network devices is performed using one protocol selected from a group of protocols consisting of intermediate system to intermediate system (IS-IS) and open shortest path first (OSPF).

9. The method of claim 1, wherein the number of spine network devices is n, the number of leaf network devices is m, m is greater than or equal to $n((n/2)-1)$, and the diameter threshold of the flooding topology is four.

10. The method of claim 1, wherein the flooding topology evenly distributes link state updates among the plurality of spine devices.

11. A non-transitory computer readable medium comprising instructions that, when executed by a processor, perform a method of distributing link state information traffic, the method comprising:

building a link state database on a plurality of network devices in a spine/leaf network topology, wherein the spine/leaf network topology comprises links interconnecting the plurality of network devices that includes a plurality of spine network devices and a plurality of leaf network devices;

electing a leader from among the plurality of spine network devices;

computing, by the leader, a flooding topology, wherein:

the flooding topology specifies, a first subset of links between a plurality of non-leader network devices of the plurality of network devices, wherein each of the plurality of non-leader network devices shares link state updates using the first subset of links, a second subset of links of the leader from which the leader will share link state updates, at least one of a first link of each of the plurality of non-leader network devices is not included in the first subset, and at least one of a second link of the leader is not included in the second subset;

the flooding topology comprises a diameter that is below a diameter threshold;

a number of flooding links of any one network device of the plurality of network devices in the flooding topology does not exceed a spine degree threshold;

a number of flooding links of any one leaf network device of the plurality of leaf network devices in the flooding topology does not exceed a leaf degree threshold; and encoding, by the leader, the flooding topology to obtain an encoded flooding topology;

distributing, by the leader, the encoded flooding topology to the plurality of non-leader network devices;

after the distributing:

receiving a link state update at a non-leader network device of the plurality of non-leader network devices; and transmitting, by the non-leader network device, the link state update to only a subset of adjacent network devices, wherein the subset of adjacent network devices is determined using the encoded flooding topology and the first subset of links of the non-leader network device specified in the encoded flooding topology.

12. The non-transitory computer readable medium of claim 11, the method further comprising:

computing, by the leader, after receiving the link state update, a new flooding topology;

encoding, by the leader, the new flooding topology to obtain a new encoded flooding topology; and distributing, by the leader, the new encoded flooding topology to the plurality of network devices.

13. The non-transitory computer readable medium of claim 11, wherein the flooding topology is configured as at least a bi-connected topology.

14. The non-transitory computer readable medium of claim 11, wherein encoding the flooding topology is performed using an adjacency matrix.

15. The non-transitory computer readable medium of claim 11, wherein electing the leader comprises:

sending, from each of the plurality of network devices, a message comprising a leader priority, wherein the leader is elected based on having a highest leader priority.

16. The non-transitory computer readable medium of claim 15, wherein, when two network devices of the plurality of network devices have a same leader priority, the leader is elected based from among the two network devices by having a numerically higher identifier.

17. The non-transitory computer readable medium of claim 11, wherein building the link state database on the plurality of network devices is performed using one protocol selected from a group of protocols consisting of intermediate system to intermediate system (IS-IS) and open shortest path first (OSPF).

18. The non-transitory computer readable medium of claim 11, wherein the number of spine network devices is n, the number of leaf network devices is m, m is greater than or equal to $n((n/2)-1)$, and the diameter threshold of the flooding topology is four.

19. The non-transitory computer readable medium of claim 11, wherein the flooding topology evenly distributes link state updates among the plurality of spine devices.

* * * * *